United States Patent
Moolchandani et al.

(10) Patent No.: US 12,095,801 B2
(45) Date of Patent: Sep. 17, 2024

(54) BREACH PATH PREDICTION AND REMEDIATION

(71) Applicant: Accurics, Inc., Pleasanton, CA (US)

(72) Inventors: Omprakash Moolchandani, Bolingbrook, IL (US); Piyush Sharma, San Ramon, CA (US)

(73) Assignee: Accurics, Inc., Pleasanton, CA (US)

( * ) Notice: Subject to any disclaimer, the term of this patent is extended or adjusted under 35 U.S.C. 154(b) by 314 days.

(21) Appl. No.: 17/643,367

(22) Filed: Dec. 8, 2021

(65) Prior Publication Data

US 2023/0179623 A1   Jun. 8, 2023

(51) Int. Cl.
   *H04L 9/40* (2022.01)
   *H04L 41/22* (2022.01)
(52) U.S. Cl.
   CPC .......... *H04L 63/1433* (2013.01); *H04L 41/22* (2013.01); *H04L 63/1416* (2013.01); *H04L 63/145* (2013.01)
(58) Field of Classification Search
   None
   See application file for complete search history.

(56) References Cited

U.S. PATENT DOCUMENTS

| | | | | |
|---|---|---|---|---|
| 8,272,061 B1 * | 9/2012 | Lotem | ................. | H04L 63/1416 709/224 |
| 8,776,239 B2 * | 7/2014 | De Keukelaere | ....... | G06F 11/00 713/188 |
| 8,881,288 B1 * | 11/2014 | Levy | ..................... | G06F 21/577 709/225 |
| 10,848,515 B1 * | 11/2020 | Pokhrel | ............... | H04L 63/1433 |
| 11,533,332 B2 * | 12/2022 | Engelberg | ............. | H04L 63/145 |
| 11,709,944 B2 * | 7/2023 | Salji | ......................... | G06N 5/04 726/25 |
| 2020/0167705 A1 * | 5/2020 | Risoldi | ............... | G06Q 10/0635 |
| 2022/0060507 A1 * | 2/2022 | Crabtree | ............. | H04L 63/1433 |
| 2023/0336581 A1 * | 10/2023 | Dunn | .................... | G06F 21/577 |

OTHER PUBLICATIONS

Potrec, K., "Hardening Amazon EKS security with RBAC, secure IMDS, and audit logging," Retrieved at https://snyk.io/blog/hardening-aws-eks-security-rbac-secure-imds-audit-logging/, SNYK Blog, Jul. 7, 2021, pp. 1-22.

* cited by examiner

*Primary Examiner* — James R Turchen
(74) *Attorney, Agent, or Firm* — Invoke

(57) ABSTRACT

Techniques for detecting and remediating vulnerabilities in a network are disclosed. A system scans a network to identify network resources and relationships among the network resources. The system generates a network topology map representing the network. The system detects vulnerabilities in the network by traversing the network topology map with a set of vulnerability definitions. The system detects a vulnerability in a network node when a data describing the node corresponds to the vulnerability definition. The system identifies patterns of vulnerabilities that correspond to potential network attacks from unauthorized entities. The system determines whether combinations of vulnerability patterns amount to a potential breach. The system prioritizes remediation actions for remediating vulnerabilities based on the type and severity of vulnerability.

19 Claims, 10 Drawing Sheets

↙401

"VulnerabilityPattern": "exfiltration"
Vulnerability 1:
    SourceNodeID: EC2Instance
    TargetNodeID: SecurityGroup
    Conditions: ConnectionToInternet

⋮

Vulnerability n
TargetNodeID: S3Bucket
Condition: Unencrypted

Fig. 4

| Relationship Type | Mapping | Policy | Attack |
|---|---|---|---|
| Network | EC2 → RouteTable → Gateway | EC2 Exposed to internet | Recon ( AP1) |
| Identity | EC2 → RDS | Overly permissive IaM ( RDS ) | Data Exfil ( AP2) |
| Identity | EC2 → S3 | Overly permissive IaM ( S3 ) | Data Exfiltration |
| Identity | EC2 → Account | Overly permissive IaM | Data Exfiltration |
| Privilege | EC2 → Imdv1 | Privileged Access | Exploit ( AP3) (activator) |

BREACH PATH PREDICTION AND REMEDIATION

TECHNICAL FIELD

The present disclosure relates to detecting and remediating a breach path in a network. In particular, the present disclosure relates to detecting vulnerabilities in network nodes and determining when patterns of vulnerabilities correspond to a breach path. A system may assign priorities for remediating detected vulnerabilities.

BACKGROUND

Attackers are constantly on the lookout to find vulnerabilities in resources in computer networks. Resources in the network are typically classified as compute-type, network-type, and storage-type resources. These include combinations of hardware and software executing on the hardware, such as gateway devices having particular security configurations, servers and desktop computers executing particular applications, and databases. Each vulnerable resource provides a unique capability to an attacker that enables the attacker to perform one or more steps of a cyber kill chain. A cyber kill chain is a process by which an attacker is able to infiltrate and utilize network resources to achieve an objective. For example, attackers may pursue objectives such as data theft, intellectual property (IP) theft, espionage, political objectives (such as protest, subversion, or activism), military or cyber warfare objectives, or financial theft.

A typical cyber kill chain includes the following stages: reconnaissance, weaponization, delivery, exploitation, installation, command and control, and actions and objectives. In the reconnaissance stage, an attacker probes the resources of a target to identify vulnerabilities that can be exploited. In the weaponization stage, the attacker may create a malware program, such as a virus or worm, to exploit the vulnerabilities of the target. In the delivery stage, the attacker transmits the weapon (e.g., the malware) to the target. Examples of delivery methods include email attachments, websites, Internet connections, and USB drives. In the exploitation stage, the weaponized program acts. For example, the malware may execute on a target device to exploit a vulnerability in the target device. In the installation stage, the weaponized program installs an access point for an attacker. The access point, or "backdoor," allows the attacker to access a vulnerable resource. In the command and control stage, the weaponized program provides the attacker with access to the vulnerable resource in the network. The access may allow the attacker to identify and exploit additional vulnerable resources in the network. In the actions and objectives stage, the attacker is able to perform malicious actions, such as encrypting data, exfiltrating data, controlling operations of one or more resources in the network, and destroying data.

Upon identifying a vulnerability at an edge of a network, such as an Internet gateway connecting the network to the Internet, attackers typically seek to obtain deeper access to the network to reconnoiter and exploit resources deep in the network. An attacker may observe data traffic at one resource over an extended period of time to identify relationships between the resource and additional resources.

Network resources that are mis-configured or configured in a way that introduces a vulnerability may facilitate different types of attacker capabilities. For example, an application may be coded in such a way that allows an attacker to reconnoiter a network resource. A compute resource in the network may be misconfigured in such a way as to allow the installation of a malware program. A security policy on the network may be configured in such a way to allow reconnaissance and/or delivery between resources in the network. An unencrypted database may facilitate data exfiltration actions of an attacker.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example of a description of a breach path according to one or more embodiments;

FIG. 6 illustrates a table storing descriptions of vulnerability patterns and associated network attacks in accordance with one or more embodiments;

DETAILED DESCRIPTION

Figure 1:
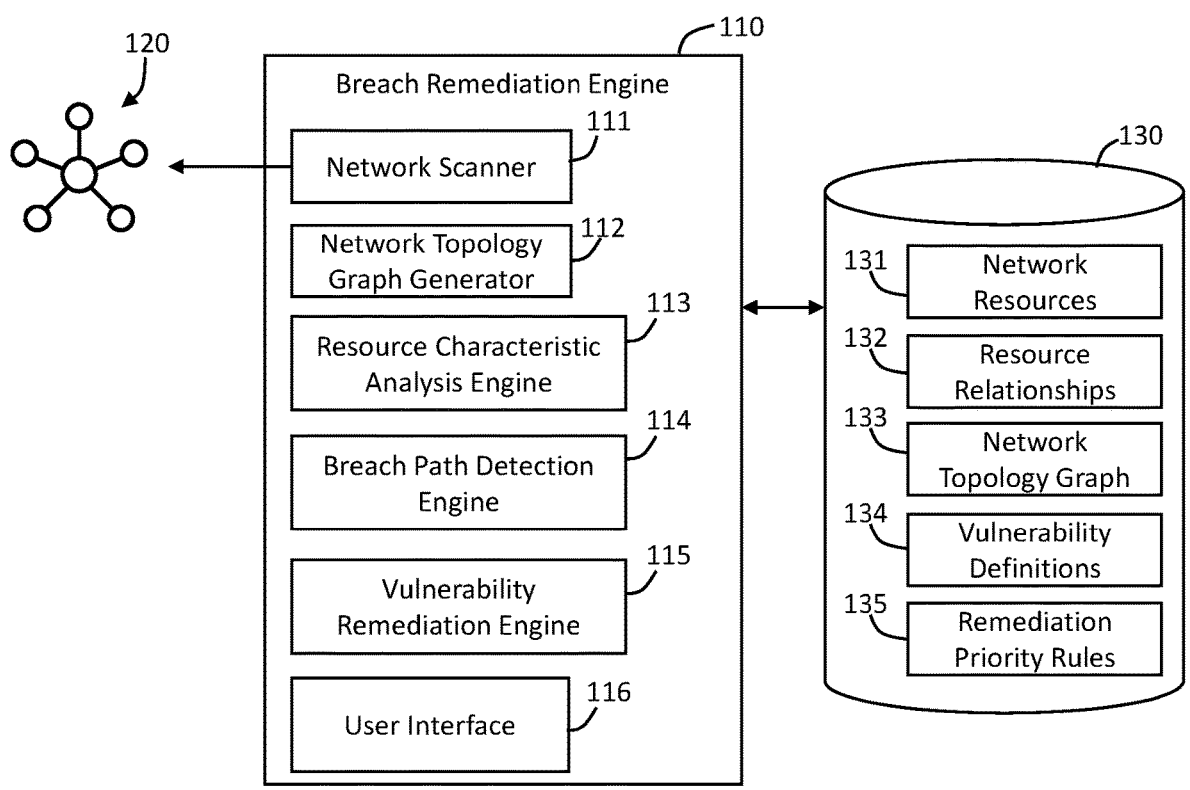
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DETECTION AND REMEDIATION OF NETWORK VULNERABILITIES
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

Computer networks are made up of different types of devices that perform different functions, such as gateway devices, compute servers, and databases. The different functions performed by the devices in the computer network are associated with different types of vulnerabilities that may be exploited by unauthorized entities. For example, a software application may give an entity access to a device and allow the entity to discover other devices in the network. A misconfigured compute server may allow an entity to upload a malicious program to the compute server. Overly permissive security protocols throughout the network may allow an entity to change configurations of devices in the network. An unencrypted database may allow an entity to exfiltrate or modify data. While one vulnerability in isolation may not result in a potential data breach by an unauthorized entity, particular combinations of vulnerabilities among different resources in the network may give rise to a potential data breach by the unauthorized entity.

One or more embodiments include system that detects vulnerabilities in a network based on network resources and relationships among the network resources. The system determines whether combinations of vulnerability patterns amount to a potential breach. The system prioritizes remediation actions for remediating vulnerabilities based on the type and severity of vulnerability.

The system scans a network to identify resources in the network and the relationships among the resources. Network resources include compute-type resources, network-type resources, and storage-type resources. Each type of resource has different characteristics that may make the resource susceptible to different types of malicious actions by unauthorized entities. In addition, the relationships among the resources may give rise to different vulnerabilities and potential breaches in the security of the network. In one embodiment, the system generates a network topology graph representing the network resources as nodes in the graph and representing relationships as one or both of connections between the nodes and separate nodes.

The system analyzes the network resources and relationships to identify vulnerabilities in the network resources. The system compares metadata specifying characteristics of the network nodes with vulnerability definitions. Vulnerability definitions specify conditions that give rise to particular vulnerabilities. For example, a vulnerability definition may specify a resource type as "database" and a configuration characteristic as "unencrypted." The vulnerability definition may associate the conditions with a vulnerability type "data exfiltration," indicating the database is susceptible to an unauthorized entity reading data from the database. Another vulnerability definition may specify a resource type as "network security protocol" and a configuration characteristic as "single-layer authentication." The vulnerability definition may associate the conditions with a vulnerability type "reconnaissance," indicating the network security protocols are susceptible to an unauthorized entity discovering characteristics of network devices within the network if the unauthorized entity gains access to one network device.

The system analyzes the detected vulnerabilities to identify patterns of detected vulnerabilities that correspond to potential network attacks. The patterns may include one or more nodes. For example, a series of low-security nodes having access to an Internet connection may be associated with a reconnaissance-type network attack that would allow an unauthorized entity to observe nodes within the network that do not have a direct connection to the Internet. As another example, a single unencrypted database may correspond to an attack pattern. As another example, a computing cluster having a misconfigured access priority protocol may correspond to an attack pattern.

The system analyzes the patterns of vulnerabilities to identify breach paths in the network. Specifically, the system predicts patterns of vulnerabilities that may be exploited by an unauthorized entity to perform an attack on a network resource. In one embodiment, the system predicts breach paths by identifying sets of two or more vulnerable resources in the network that have a pre-defined relationship. For example, a network-type resource may have a reconnaissance-type vulnerability and a compute-type resource may have an installation-type vulnerability. The system may determine that the network-type resource has a relationship of being along a communication path with the compute-type resource. The system may determine that the combination of vulnerable resources corresponds to a breach path that could be exploited by an unauthorized entity.

In one embodiment, upon identifying two vulnerable network resources having particular vulnerability types, the system searches for a third network resource having another particular vulnerability type to determine whether the vulnerable network resources constitute a breach path to the network. For example, a gateway may be susceptible to a reconnaissance-type attack and a database may be susceptible to a data exfiltration-type attack. However, if no network node between the gateway and the database is susceptible to exploitation-type attacks, the system may determine that a breach path does not exist. Conversely, if the system determines that a third node along a communication path including the gateway and the database is susceptible to having a malicious program installed in the third node, the system predicts the gateway, the database, and the third node may be used as a breach path for an unauthorized entity.

In one or more embodiments, the system predicts whether a potential modification to an existing network would result in the creation of a breach path. For example, the system may receive a request to modify the network topology description to include a new database interconnected with one or more existing nodes in the network topology. The system may determine that the proposed addition of the database would place the database in an insecure subnet. The system may further predict that placing the proposed database in the network would result in a combination of node vulnerabilities among the existing nodes and the proposed new database would amount to a breach path in the network. Alternatively, the system may receive a request to remove a resource from the network topology. The system may determine whether the removal of the resource would result in the creation of a breach path in the network. For example, modifying the relationships of two existing nodes relative to each other by executing the request to remove the resource may result in a vulnerability pattern that would give rise to a breach path in the network.

The system identifies remediating actions to remediate the vulnerabilities in the network resources. The system compares the vulnerabilities to prioritize the remediation actions. The system may apply a set of rules for identifying resources and relationships that correspond to a higher priority than other resources and relationships. For example, the system may determine that performing one remediation action without performing another remediation action for two vulnerable resource remediates a network breach vulnerability. The system may prioritize this remediation action over another that leaves intact the network breach vulnerability.

One or more embodiments described in this Specification and/or recited in the claims may not be included in this General Overview section.

2. System Architecture

A data monitoring system obtains data from multiple sources in multiple different formats and having different granularity. The data monitoring system analyzes the data for quality and provides a uniform measure of data quality to a user.

FIG. 1 illustrates a system 100 in accordance with one or more embodiments. As illustrated in FIG. 1, system 100 includes a breach remediation engine 110, a network 120, and a data repository 130.

The breach remediation engine 110 includes a network scanner 110 to scan the network 120. The network scanner 110 identifies network resources and relationships among the network resources. The network scanner 111 may store metadata associated with the network resources 131 and the resource relationships 132 in a data repository 130. Examples of network resources include compute-type resources, network-type resources, and storage-type resources. Compute-type resources, such as compute servers, perform computations and run applications in the network. Network-type resources, such as load balancers, gateways, and routers, facilitate communication among resources in the network. Storage-type resources, such as databases stored on hard drives of database servers, store data. Network resources include physical devices and virtual devices and machines that run on the physical devices. For example, compute-type resources include virtual machines and compute instances running on servers. Network-type resources include virtual private clouds, elastic load balancers, application load balancers, and virtual networks. Relationship information identified by the network scanner includes information regarding connections between different resources and identify information associated with a resource. Examples of resource relationship information includes subnet information, Internet protocol information, an identity of a resource, access information associated with the resource, and privilege information associated with the resource.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the breach remediation engine 110. Alternatively, or additionally, a data repository 130 may be implemented or executed on a computing system separate from the breach remediation engine 110. A data repository 130 may be communicatively coupled to the breach remediation engine 110 via a direct connection or via a network.

A network topology graph generator 112 uses the descriptions of the network resources 131 and the relationships among the network resources 132 to generate a network topology graph 133. The network topology graph 133 includes a description of each network resource and the relationship information of the network resource. In one embodiment, the system displays the network topology graph 133 on a graphical user interface (GUI) of the user interface 116. In the displayed network topology graph, resources may be represented as nodes and may be displayed as shapes, such as circles. Relationships may be represented as lines connecting the nodes and as additional nodes, displayed as additional shapes. In addition, or in the alternative, the system may store the network topology description in a graph format without displaying the network topology graph 133.

A resource characteristic analysis engine 113 analyzes characteristics of the resources in the network to detect vulnerabilities. The resource characteristic analysis engine 113 applies a set of vulnerability definitions 134 to metadata describing the nodes of the network topology graph to determine whether a node matches a defined vulnerability. For example, a vulnerability definition 134 may identify a type of resource and one or more characteristics associated with a vulnerability. The resource characteristic analysis engine 113 detects a vulnerability when the metadata of the resource matches the conditions described in the vulnerability definition. For example, a vulnerability definition may include a resource "application" associated with a conditions "communication port privileges." The vulnerability definition may identify any applications running on the network that meet the condition. The vulnerability definition associates the conditions with a vulnerability "reconnaissance," indicating that the identified vulnerability may allow an unauthorized user to obtain information about a resource running the application and a resource connected to the resource running the application.

The resource characteristic analysis engine 113 may further detect patterns of two or more vulnerabilities in the network. For example, the resource characteristic analysis engine 113 may detect a string of resources with a "reconnaissance" vulnerability, a set of resources with a "weaponization" and "delivery" vulnerability, or any combination of one or more vulnerabilities.

The resource characteristic analysis engine 113 may further detect nodes having a special vulnerability called an "activator"-type vulnerability. While one or more nodes may have particular vulnerabilities, the vulnerabilities may not be able to be exploited by an unauthorized entity if the nodes are not in communication with a node having an activator-type vulnerability. For example, the resource characteristic analysis engine 113 may detect a compute-type node having a misconfigured security setting that would allow an unauthorized entity to control operations of the compute-type node. However, if the compute-type node is not in communication with a node that would allow for an unauthorized user to install a program to enable control of the compute-type node, the vulnerability could not be exploited by the unauthorized entity. Accordingly, the resource characteristic analysis engine 113 may determine whether particular vulnerability definitions are associated with activator-type vulnerabilities that would enable unauthorized entities to exploit vulnerabilities in other nodes.

Figure 3:
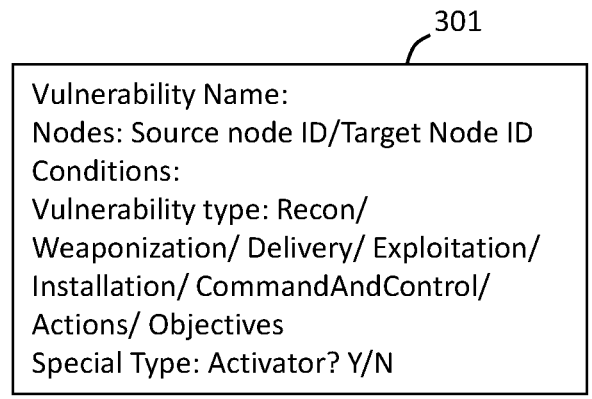
FIG. 3 illustrates an example of a vulnerability definition according to one or more embodiments.

FIG. 3 illustrates an example of a vulnerability definition 301 according to one or more embodiments. The vulnerability definition 301 specifies whether a particular vulnerability is associated with a particular type of source node and/or target node. The definition 301 specifies any conditions of the node that would cause the node to be associated with the particular vulnerability type. The definition 301 further specifies a vulnerability type associated with the definition 301. Example vulnerability types include reconnaissance, weaponization, delivery, exploitation, installation, command and control, and actions and objectives. The definition 301 further specifies whether the vulnerability is associated with a special vulnerability, such as an activator-type vulnerability that allows vulnerabilities in the network to be exploited as breach paths by unauthorized entities.

A breach path detection engine 114 analyzes the detected vulnerabilities to determine whether a set of vulnerabilities corresponds to a breach path, or a path for an unauthorized entity to exploit a vulnerability in the network. The breach path detection engine 114 may detect a breach path based on determining: (1) a set of nodes having particular vulnerabilities (2) have particular relationships. Each breach path includes a set of two or more vulnerable nodes in the network. The vulnerable nodes have vulnerabilities associated with predefined patterns. Accordingly, breach path detection engine 114 detects and identifies a type of breach path associated with a particular pattern of vulnerable nodes. For example, the breach path detection engine 114 may identify a first vulnerability pattern including one node having a reconnaissance-type vulnerability and another node having a weaponization-type vulnerability. The breach path detection engine 114 may identify another vulnerability pattern including one node having a delivery-type vulnerability and an exploitation-type vulnerability. The breach path detection engine 114 detects a breach path enabling an unauthorized entity to exploit a particular resource in the network based on determining the set of nodes associated with the first vulnerability pattern is in communication with the set of nodes associated with the second vulnerability pattern. In one embodiment, the breach path detection engine 114 may further identify at least one of the vulnerability patterns as including an activator-type vulnerability. The breach path detection engine 114 may detect the breach path enabling an unauthorized entity to exploit a particular resource in the network based on determining (1) the set of nodes associated with the first vulnerability pattern is in communication with the set of nodes associated with the second vulnerability pattern, and (2) a particular node in the sets of nodes includes the activator-type vulnerability. For example, the activator-type vulnerability may be the exploitation-type vulnerability.

FIG. 4 illustrates an example of a breach path 401 according to one or more embodiments. The breach path 401 specifies a sequence of vulnerable nodes and any conditions met by the vulnerable nodes that correspond to particular vulnerabilities. In one embodiment, the nodes correspond to a contiguous chain of nodes in the network. In other words, the target node of one detected vulnerability is the source node of the next detected vulnerability, forming a chain between an initial source node ("EC2Instance" in FIG. 4) and a terminal target node ("S3Bucket" in FIG. 4). In an alternative embodiment, detected vulnerabilities include specified relationships among the nodes in the pattern of vulnerabilities that comprise the breach path. For example, one node may not be in direct communication with another node, but instead may run an insecure application that allows an unauthorized entity to access other nodes in the network.

A vulnerability remediation engine 115 identifies actions for remediating detected vulnerabilities in the network. Example actions include: changing security protocols, altering physical or virtual communications connections among nodes in the network, changing applications able to be run on the network, changing permissions for viewing/modifying/deleting data on one or more nodes of the network, configuring partitions to isolate one or more applications or virtual storage from other applications or virtual storage, and installing or modifying monitoring applications at one or more nodes of the network.

In one or more embodiments, the vulnerability remediation engine 115 generates a list of remediation actions to remediate detected vulnerabilities and arranges the list according to priority. The priority may be determined by applying a set of rules 135 to the remediation actions. For example, a user may define one or more rules, such as: indicating that a particular vulnerability should be ignored or assigned a low priority for remediation, or indicating that a particular resource is important and associated vulnerabilities should be assigned a high priority for remediation. In addition, a rule may dictate that vulnerabilities associated with more advanced stages of a breach path should be remediated prior to less advanced stages of a breach path. For example, vulnerabilities that would enable an unauthorized entity to install malware on a resource may be assigned a higher priority than a vulnerability that would enable an unauthorized entity to reconnoiter a resource without installing malware. Similarly, a vulnerability that would enable an unauthorized entity to install a backdoor in a resource to allow the unauthorized entity control over the resource may be assigned a higher priority than a vulnerability that would enable the unauthorized entity to read data from a resource. According to another example, the system may determine that performing one remediation action associated with one node on a breach path, without performing another remediation action for another node on the breach path, would close the breach path. The system may further determine that performing the latter remediation action without performing the former remediation action would leave the breach path intact. The system may accordingly prioritize the former remediation action over the latter, giving a higher priority to the remediation action that would close the breach path.

In one or more embodiments, the vulnerability remediation engine 115 may initiate remediation of the vulnerabilities according to the specified rules 135 without obtaining user input, between the time the vulnerabilities are detected and the time the remediation actions are identified for the vulnerabilities. Alternatively, the vulnerability remediation engine 115 may provide the proposed remediation actions to the user interface 116 to receive user authorization to initiate remediation actions.

Figure 5:
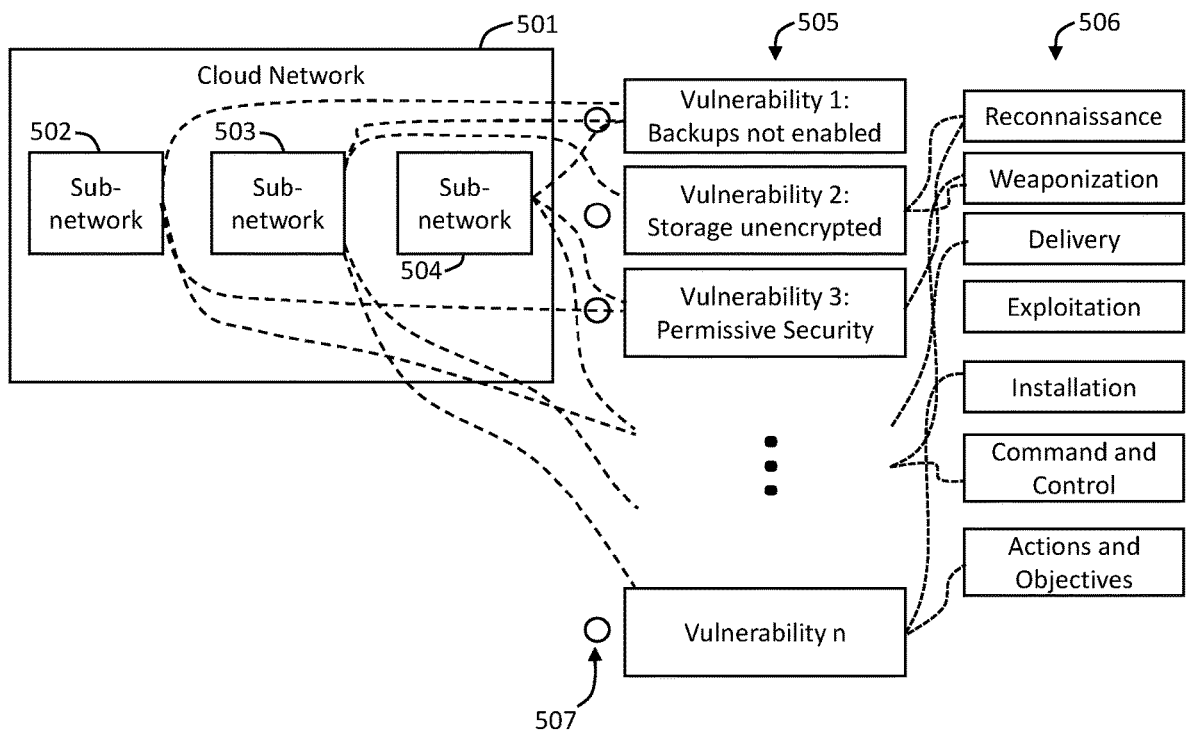
FIG. 5 illustrates an example of a graphical user interface displaying networks, vulnerabilities, and breach paths in accordance with one or more embodiments.

FIG. 5 illustrates an example of a GUI 500 displaying for a user sub-networks 502, 503, and 504 of a cloud network 501 scanned by the network scanner 111. The GUI 500 includes a list 505 of detected vulnerabilities. The breach path detection engine 114 identifies which patterns among the vulnerabilities 505 correspond to breach paths 506 which would enable an unauthorized entity to exploit vulnerabilities in the network. The user interface 116 may display color-coded visual elements 507 to indicate a priority for remediating particular vulnerabilities associated with particular breach paths 506.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 7, titled "Computer Networks and Cloud Networks."

In one or more embodiments, the breach remediation engine 110 refers to hardware and/or software configured to perform operations described herein for detecting vulnerabilities in network nodes, detecting potential breach paths resulting from the vulnerabilities, and identifying remediation actions to address the vulnerabilities. Examples of operations for detecting vulnerabilities in network nodes, detecting potential breach paths resulting from the vulnerabilities, and identifying remediation actions to address the vulnerabilities are described below with reference to FIGS. 2A and 2B.

In an embodiment, the breach remediation engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 116 refers to hardware and/or software configured to facilitate communications between a user and the breach remediation engine 110. The interface 116 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 116 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 116 is specified in one or more other languages, such as Java, C, or C++.

3. Detection and Remediation of Network Vulnerabilities

Figure 2A:
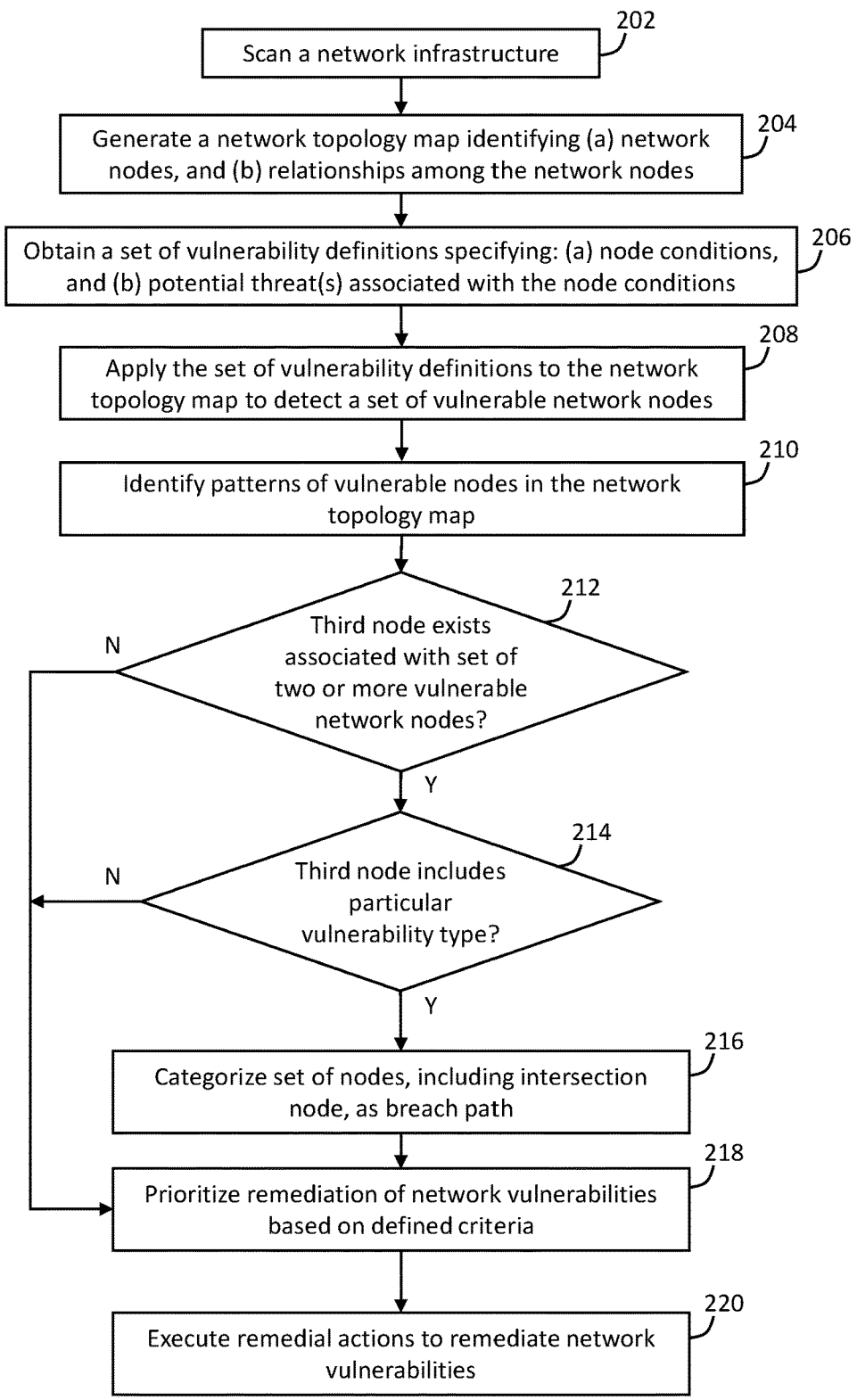
FIGS. 2A and 2B illustrate example sets of operations for analyzing data quality in accordance with one or more embodiments.

FIG. 2A illustrates an example set of operations for detecting and remediating vulnerabilities in network nodes in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

A system scans a network to identify resources in the network and the relationships among the resources (Operation 202). Network resources include compute-type resources, network-type resources, and storage-type resources. Resources may include hardware, software running on the hardware, sub-networks of connected resources, and clusters of load-balancing resources. Each type of resource has different characteristics that may make the resource susceptible to different types of malicious actions by unauthorized entities. In addition, the relationships among the resources may give rise to different vulnerabilities and potential breaches in the security of the network. Relationships may include inter-relationships, such as a location of one node relative to another node, as well as access rights of a node, permissions granted to one node The system generates a network topology map based on the identified resources and relationships (Operation 204). In one embodiment, the system generates a network topology graph representing the network resources as nodes in the graph and representing relationships as one or both of connections between the nodes, separate nodes, and overlays over resource nodes. The node may be stored as a graph. In one embodiment, the graph is displayed on a graphical user interface (GUI).

The system obtains a set of vulnerability definitions (Operation 206). The vulnerability definitions specify node conditions and a vulnerability associated with the node conditions. For example, a vulnerability definition may specify that (a) a data storage-type resource, (b) having permissive data access policy vulnerability, (c) corresponds to an exploitation-type attack that would enable an unauthorized entity to exfiltrate data from the data storage-type resource. As another example, a vulnerability definition may specify that (a) an application run on multiple compute-type resources (b) having a vulnerability including functionality of communicating with an external communication resource (c) corresponds to a reconnaissance-type attack. The set of vulnerability definitions may include subsets of vulnerability definitions, each subset specifying one or more resources associated with one or more conditions corresponding to one or more vulnerabilities.

The system applies the set of vulnerability definitions to the network topology map to detect a set of vulnerable network nodes (Operation 208). The system may compare metadata describing the nodes of the network topology map to the vulnerability definitions to determine whether a particular node is associated with a particular vulnerability and a corresponding potential attack on the network. In one embodiment, the system applies a graph-traversal algorithm to the network topology graph to compare each node of the network topology graph to the vulnerability definitions.

The system identifies patterns of vulnerable nodes in the network topology map to identify candidate breach paths (Operation 210). For example, a set of vulnerable nodes having one pattern of vulnerabilities may correspond to a candidate breach path for a reconnaissance-type breach which would enable an unauthorized entity to gather information about one or more nodes in the network. Another set of vulnerable nodes having another pattern of vulnerabilities may correspond to a candidate breach path for a delivery-type breach path that would allow an unauthorized entity to deliver a program to one or more nodes in the network. The system identifies the breach paths by identifying a candidate start node, a candidate end node, and attack capabilities enabled by vulnerability patterns of nodes between the candidate start node and candidate end node.

FIG. 6 illustrates a table 610 representing a set of identified vulnerability patterns according to one embodiment. The table 601 describes a mapping 611 between two or more nodes. The table 610 describes a relationship-type 612 of the respective mappings between the two or more nodes. The table 610 further includes a description 613 of a detected vulnerability. The table further includes a name of a potential attack-type 614 associated with the detected vulnerability. For example, FIG. 6 identifies a mapping of a node EC2, RouteTable, Gateway that has a vulnerability of being exposed to the Internet and is associated with a reconnaissance-type attack on the network.

In one embodiment, the system determines whether a third node exists associated with two or more vulnerable network nodes (Operation 212). For example, the system may identify a vulnerability pattern associated with two network nodes. The system may traverse nodes in communication with the two network nodes to determine whether any node is associated with the two network nodes. For example, the system may determine whether a node exists along a communication path between the two network nodes. Alternatively, the system may determine whether a node exists that is in communication with the two network nodes, but not along a communication path between the two nodes. For example, the two nodes may be in communication with each other, and the third node may have a relationship with each of the two nodes.

The system determines whether the third node includes a particular vulnerability of a particular vulnerability type (Operation 214). The system may define particular vulnerability types as "activators" when nodes having the particular vulnerability types have specified relationships with other vulnerable nodes. For example, the system may identify one node having an installation-type vulnerability that would enable an unauthorized entity to install a malicious program on the node. The system may identify another node having a command-and-control type vulnerability that would enable an unauthorized entity to modify characteristics of the node, such as adding, modifying, removing data, applications, or programs. However, the combination of the two nodes may be insufficient to give rise to a breach path without a third node in communication with the two nodes and having an exploitation-type vulnerability. Upon identifying the two network nodes, the system may traverse the nodes connected to the two nodes to determine whether any node having a pre-defined relationship with the two nodes includes the exploitation-type vulnerability.

Responsive to identifying a particular pattern of vulnerable nodes, including at least one node having an activator-type vulnerability, the system identifies a breach path in the network (Operation 216). The system may designate the breach path as a potential breach path that could be exploited by an unauthorized entity to perform a particular attack in the network. The system may determine the severity of breach paths based on potential attacks associated with the breach paths. For example, the system may designate a reconnaissance-type breach path that could enable an unauthorized entity to obtain information about network nodes as being less severe than an exploitation-type breach path that would allow the unauthorized entity to modify characteristics of a network node.

The system identifies potential remediation actions for remediating the identified vulnerabilities in the network. The system prioritizes the remediation actions based on pre-defined criteria (Operation 218). For example, the criteria may include: an attack type associated with the breach path, whether the breach path includes a particular node designated as having a high importance by a user, and whether the breach path includes an activator-type vulnerability. According to another example, the system may determine that performing one remediation action without performing another remediation action for two vulnerable resource closes a network breach. The system may prioritize this remediation action over another remediation action that would leave intact the network breach.

The system executes a remedial action to remediate one or more vulnerabilities in the network (Operation 220). In one embodiment, the system executes a remedial action without obtaining user input after detecting the vulnerability. In an alternative embodiment, the system displays a set of vulnerabilities to user via a GUI. The user may select which vulnerabilities to address, how to address the vulnerabilities, and in what order to address the vulnerabilities. For example, the user may instruct the system to ignore a particular vulnerability associated with a particular network node. The user may also select one or more actions to address a vulnerability, such as modifying security protocols and changing a configuration of network resources.

According to one example, the system detects a request to add a new resource to an existing network topology. The system determines whether the new resource includes a vulnerability associated with a potential attack on the network. Th system further determines whether the characteristics of the requested addition of the new resource, such as a location of the resource in the network, would give rise to a breach path. Based on determining that the requested addition would result in a new vulnerability or a new breach path, the system may notify a user of the new vulnerability or the new breach path. The user may determine whether to continue with the requested modification to the network or to alter one or more characteristics or relationships associated with the requested modification.

Figure 2B:
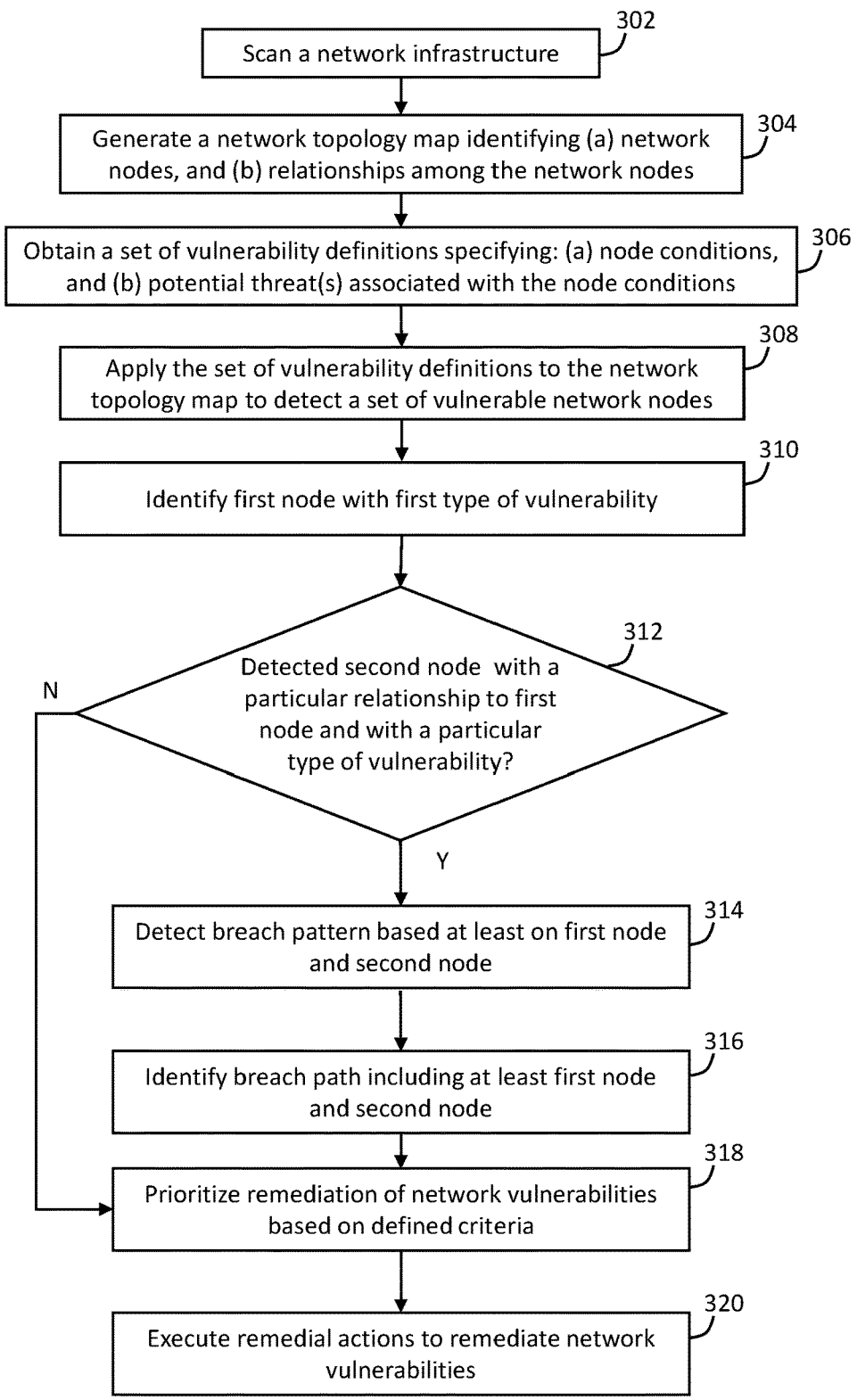

FIG. 2B illustrates an example set of operations for detecting and remediating vulnerabilities in network nodes in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

A system scans a network to identify resources in the network and the relationships among the resources (Operation 302). The system generates a network topology map based on the identified resources and relationships (Operation 304). The system obtains a set of vulnerability definitions (Operation 306). The system applies the set of vulnerability definitions to the network topology map to detect a set of vulnerable network nodes (Operation 308). The processes of scanning a system, generating a topology map, obtaining vulnerability definitions, and detecting vulnerable network nodes are previously described in connection with FIG. 2A, Operations 202, 204, 206, and 208.

The system identifies a first node with a first type of vulnerability (Operation 310). For example, having detected the set of vulnerable network nodes, the system may select one and identify the vulnerability type associated with the selected node.

The system determines whether a second node is detected with a particular relationship to the first node and with a particular type of vulnerability (Operation 312). For example, the particular relationship may include two nodes along a communications path within the network. Another particular relationship may include one node having privileges to direct operations of another node. Another particular relationship may include one node storing data from another node.

The system identifies a particular breach pattern based on the first node and the second node (Operation 314). For example, one breach pattern may include a vulnerability associated with a delivery-type network attack and a vulnerability associated with an exploitation-type network attack. Another breach pattern may include two vulnerabilities associated with reconnaissance-type network attacks. The breach patterns may include as few as two nodes and at least one vulnerability type. However, embodiments include breach patterns comprising two or more nodes and as many different vulnerability types as exist. For example, in a security protocol that identifies seven different network attack types (such as "reconnaissance," "weaponization," "delivery," etc.) the breach pattern may include up to seven different vulnerability types.

Based on the detected breach patterns, the system identifies any breach patterns that amount to a breach path (Operation 316). For example, a breach pattern including two non-contiguous nodes in a network may not amount to a breach path that an unauthorized entity would be able to exploit to breach the network. In contrast, a breach pattern including particular network nodes having particular vulnerability types and at least one node connected to the Internet may amount to a breach path. While an example, describing two nodes is provided for purposes of description, embodiments encompass breach paths having any number of nodes.

The system identifies potential remediation actions for remediating the identified vulnerabilities in the network. The system prioritizes the remediation actions based on predefined criteria (Operation 318). For example, the criteria may include: an attack type associated with the breach path, whether the breach path includes a particular node designated as having a high importance by a user, and whether the breach path includes an activator-type vulnerability. According to another example, the system may determine that performing one remediation action without performing another remediation action for two vulnerable resource closes a network breach. The system may prioritize this remediation action over another remediation action that would leave intact the network breach.

The system executes a remedial action to remediate one or more vulnerabilities in the network (Operation 320). In one embodiment, the system executes a remedial action without obtaining user input after detecting the vulnerability. In an alternative embodiment, the system displays a set of vulnerabilities to user via a GUI. The user may select which vulnerabilities to address, how to address the vulnerabilities, and in what order to address the vulnerabilities. For example, the user may instruct the system to ignore a particular vulnerability associated with a particular network node. The user may also select one or more actions to address a vulnerability, such as modifying security protocols and changing a configuration of network resources.

4. Example Embodiment

Figure 7A:
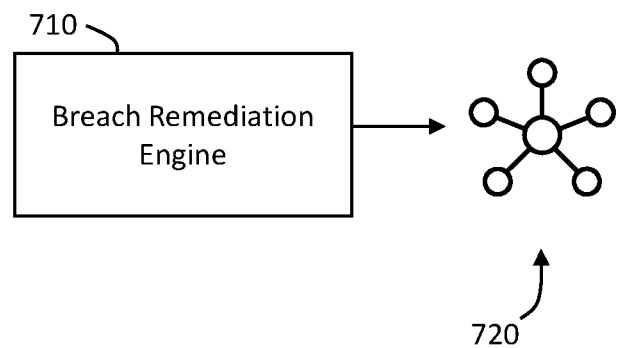
FIGS. 7A and 7B illustrate an example embodiment for identifying vulnerabilities in a network, breach paths, and remediating actions associated with the vulnerabilities in accordance with one or more embodiments.
Figure 7B:
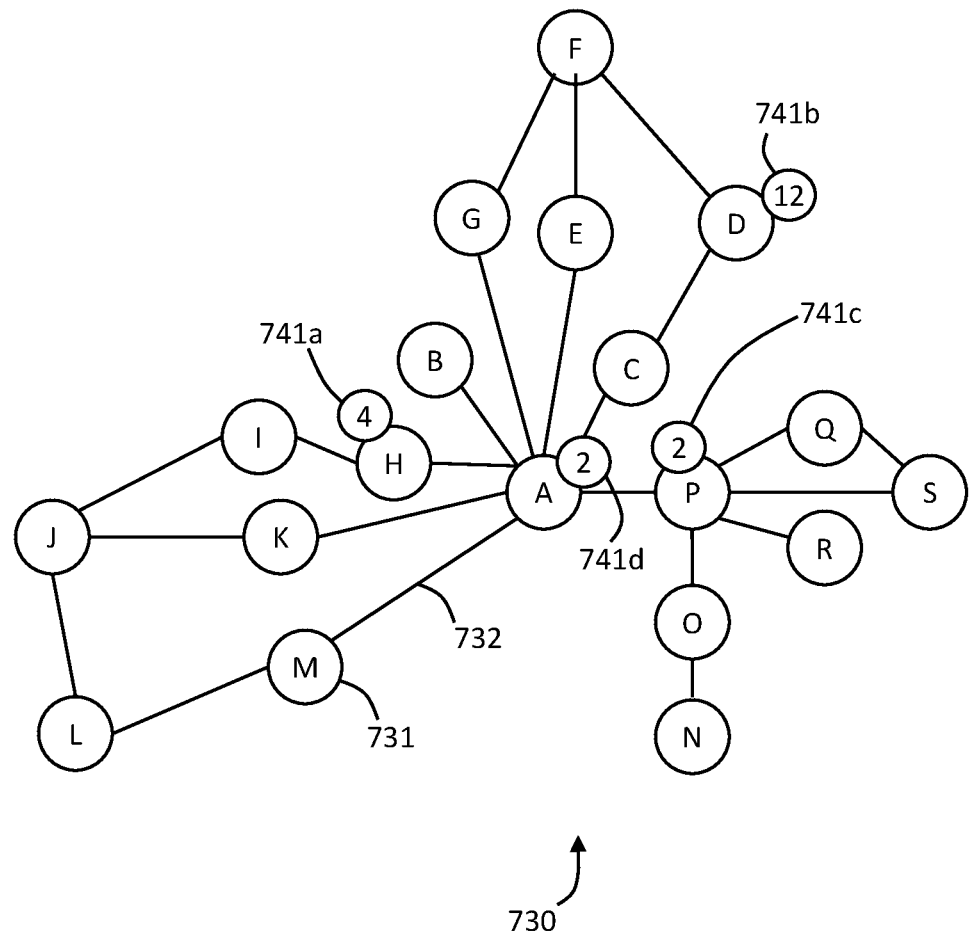

FIGS. 7A and 7B illustrate detecting a breach path in a network topology in accordance with one or more embodiments. A breach remediation engine 710 scans a network 720 to identify the resources in the network and the relationships among the resources. In the example illustrated in FIG. 7B, the breach remediation engine 710 generates a network topology map 730 including nodes 731 and connections 732 representing communication paths between the nodes 731. The system detects nodes A-S in the network 720. The system further detects relationships among the nodes, including communication paths 732. In one or more embodiments, the system may detect that a node includes a cluster of nodes, represented as graphical representations 741a, 741b, and 741c. For example, the system may identify node H as a sub-network of four nodes. Accordingly, the system generates a visual identifier 741a to display with the node H.

The breach remediation engine traverses the network topology map 730 to identify vulnerabilities in the nodes 731. The breach remediation engine applies vulnerability definitions to the metadata describing characteristics of the nodes to determine whether the nodes correspond to vulnerabilities specified by the vulnerability definitions. For example, the breach remediation engine may determine: (a) node N is a gateway node connected to the Internet, (b) node O is a routing table stored in a device in communication with node N, (c) node P is a server cluster in communication with node N having a misconfigured privilege setting, (d) nodes Q. R. and S are devices or data structures stored in devices having overly-permissive security protocols.

The breach remediation engine identifies patterns among the node vulnerabilities and potential network attacks associated with the patterns. For example, the breach remediation engine may determine: (a) the combination of vulnerabilities of nodes N, O, and P corresponds to a reconnaissance-type attack that would enable an unauthorized entity to obtain information about and/or observe data traffic associated with node P. (b) the vulnerabilities of nodes Q, R. and S make the nodes susceptible to data exfiltration-type network attacks, and (c) the misconfiguration of privilege settings in node P corresponds to an exploitation-type attack, that would enable an unauthorized entity having access to node P to run a malicious program to exploit the vulnerability of node P to perform one or more network attacks.

The breach remediation engine analyzes the vulnerability patterns to determine whether any combination of vulnerability patterns amounts to a breach path. For example, the breach remediation engine may determine that the combination of (a) the recon-type pattern associated with nodes N, O, and P, and (b) the data exfiltration-type vulnerability of nodes Q, R. and S would be candidate breach paths if associated with an activation-type vulnerability. The breach remediation engine may further identify the misconfiguration of privilege settings of node P as being an activator-type vulnerability that, in combination with a recon-type vulnerability pattern and a data exfiltration-type vulnerability pattern would result in a breach path. Accordingly, the breach remediation engine may identify any of the following paths as breach paths: N,O,P,Q; N,O,P,S; N,O,P,Q,S; or N,O,P,R.

The breach remediation engine identifies actions for remediating vulnerabilities in the network. The breach remediation engine may identify a first type of action, such as installation of a firewall, to address a vulnerability of a node connected to a network. The breach remediation engine may identify changes in privilege settings to increase security for higher privilege levels and reduce privileges for more types of access. The breach remediation engine may identify changes in security protocols to reduce the permissiveness of the protocols.

The breach remediation engine priorities the remediation actions based on predefined rules. For example, the breach remediation engine may give remediation of a vulnerability in node P the highest level of priority, since node P includes an activator-type vulnerability that facilitations exploitation of vulnerabilities in node P and surrounding nodes. Alternatively, the breach remediation engine may give the highest priority to remediating a vulnerability in node Q based on determining that node Q is of high importance to a user of the network. In addition, the remediation prioritization rules may give higher priority to a remediation action that takes less time, consumes fewer resources, or results in less down-time than other remediation actions. The remediation prioritization rules may give higher priority to one type of node over another—such as a network-type node over a compute-type node or storage-type node.

The breach remediation engine either performs the remediation actions independently of user input or presents proposed remediation actions for user approval.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
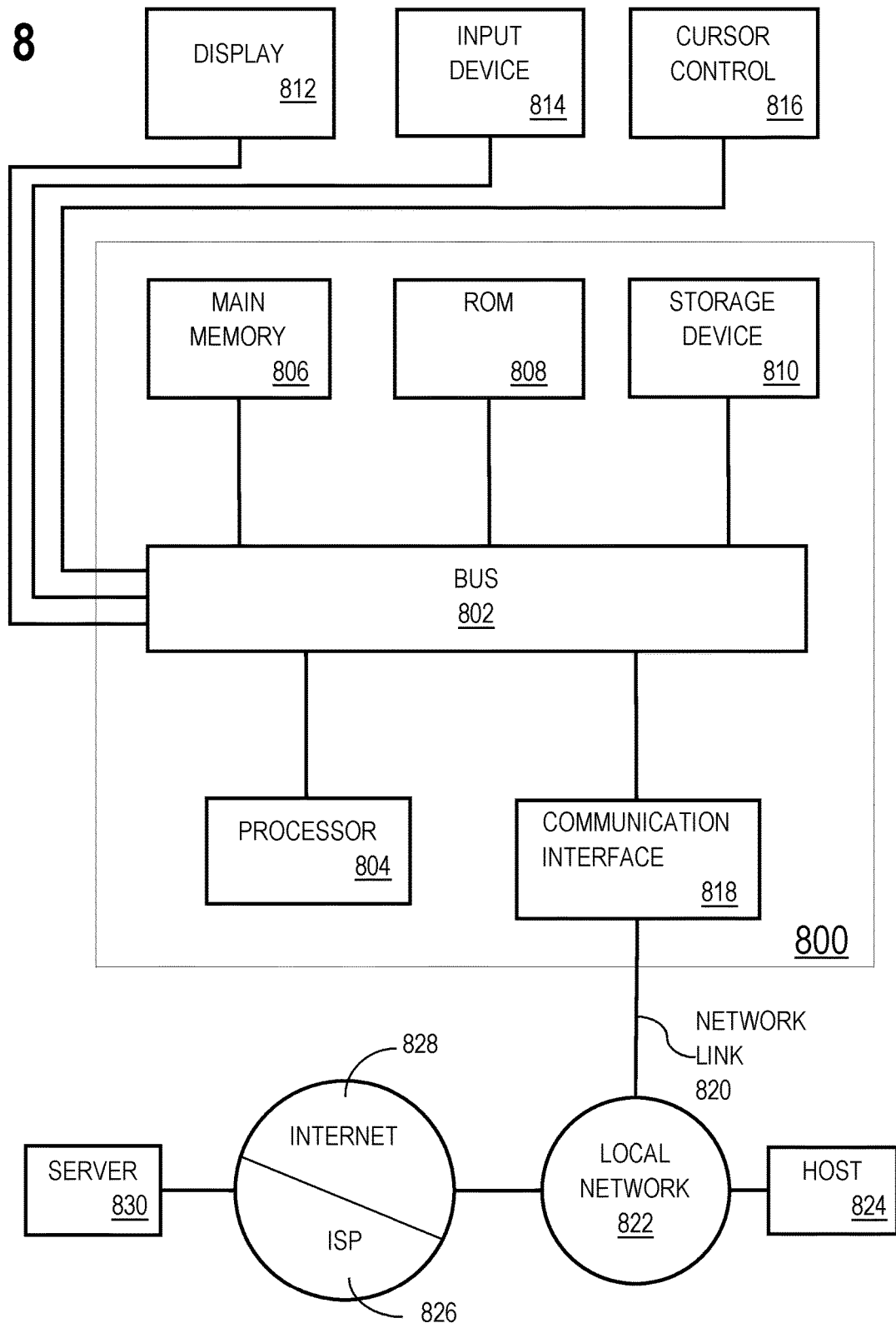
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A non-transitory computer readable medium comprising instructions which, when executed by one or more hardware processors, causes performance of operations comprising:
   obtaining a network topology description, the network topology description describing a plurality of network nodes and relationships among the plurality of network nodes;
   applying a set of vulnerability definitions to the network topology description to detect a set of vulnerability states associated with a first set of network nodes among the plurality of network nodes;
   based on the set of vulnerability states associated with the first set of network nodes, identifying two or more network nodes having a particular relationship, the two or more network nodes comprising a first network node corresponding to a first vulnerability state and a second network node corresponding to a second vulnerability state;
   determining that the first vulnerability state and the second vulnerability state correspond to a predefined pattern of vulnerability states;

responsive to (a) identifying the predefined pattern of vulnerability states and (b) determining the first network node and the second network node have a particular relationship:
  identifying a potential breach path associated with the first network node and the second network node;
  based on identifying the potential breach path associated with the two or more network nodes:
    searching the network topology description for a third network node along a communication path between the first network node and the second network node; and
  based on identifying the third network node: designating a set of network nodes including the first network node, the second network node, and the third network node as the breach path.

2. The non-transitory computer readable medium of claim 1, wherein the set of vulnerability states includes a capability for an unauthorized entity to perform one or more of:
  installing a program on the second network node;
  modifying, destroying, or reading data stored in the second network node; and
  controlling an operation of the second network node.

3. The non-transitory computer readable medium of claim 1, wherein determining the first vulnerability state and the second vulnerability state correspond to the predefined pattern of vulnerability states comprises:
  determining that the first vulnerability state of the first network node is a first vulnerability state type; and
  determining that a second vulnerability state of the second network node is a second vulnerability state type different from the first vulnerability state type.

4. The non-transitory computer readable medium of claim 3, wherein the instructions further cause performance of operations, comprising:
  based on comparing the first vulnerability state type to the second vulnerability state type:
    generating a vulnerability remediation policy prioritizing a first remediation action to remediate the first vulnerability state above a second remediation action to remediate the second vulnerability state.

5. The non-transitory computer readable medium of claim 4, wherein generating the vulnerability remediation policy prioritizing the first remediation action above the second remediation action includes: (a) determining that performing the first remediation action without performing the second remediation action closes the breach path, and (b) determining that performing the second remediation action without performing the first remediation action leaves intact the breach path.

6. The non-transitory computer readable medium of claim 1, wherein the set of vulnerability definitions map vulnerabilities of the first network node and the second network node to network threats resulting from the vulnerabilities.

7. The non-transitory computer readable medium of claim 6, wherein the network threats comprise a capability to enable an unauthorized entity to perform one or more of:
  monitoring communications in a network including the plurality of network nodes;
  installing a program on one or more of the plurality of network nodes;
  creating of an access point for a third party in the network;
  modifying or destroying data in the network; and
  controlling one or more of the plurality of network nodes.

8. The non-transitory computer readable medium of claim 1, wherein the instructions further cause performance of operations, comprising:
  generating a network topology graph,
wherein applying the set of vulnerability states to the network topology description comprises traversing to network topology graph to apply the set of vulnerability definitions to each network node of the network topology graph.

9. The non-transitory computer readable medium of claim 1, wherein each vulnerability definition includes a set of one or more conditions,
  wherein applying the set of vulnerability definitions to the network topology description includes sequentially comparing metadata for respective network nodes among the plurality of network nodes to the set of one or more conditions, and
  wherein detecting the set of vulnerability states associated with the first set of network nodes comprises determining a respective network node among the first set of network nodes meets the one or more conditions associated with a particular vulnerability state definition.

10. The non-transitory computer readable medium of claim 1, wherein searching the network topology description for the third network node, further comprises:
  determining the third network node corresponds to a third vulnerability state; and
  determining the first vulnerability state, the second vulnerability state, and the third vulnerability correspond to the predefined pattern of vulnerability states associated with the breach path.

11. A method, comprising:
  obtaining a network topology description, the network topology description describing a plurality of network nodes and relationships among the plurality of network nodes;
  applying a set of vulnerability definitions to the network topology description to detect a set of vulnerability states associated with a first set of network nodes among the plurality of network nodes;
  based on the set of vulnerability states associated with the first set of network nodes, identifying two or more network nodes having a particular relationship, the two or more network nodes comprising a first network node corresponding to a first vulnerability state and a second network node corresponding to a second vulnerability state;
  determining that the first vulnerability state and the second vulnerability state correspond to a predefined pattern of vulnerability states;
  responsive to (a) identifying the predefined pattern of vulnerability states and (b) determining the first network node and the second network node have a particular relationship:
    identifying a potential breach path associated with the first network node and the second network node;
    based on identifying the potential breach path associated with the two or more network nodes:
      searching the network topology description for a third network node along a communication path between the first network node and the second network node; and
    based on identifying the third network node: designating a set of network nodes including the first network node, the second network node, and the third network node as the breach path.

12. The method of claim 11, wherein the set of vulnerability states includes a capability for an unauthorized entity to perform one or more of:
  installing a program on the second network node;

modifying, destroying, or reading data stored in the second network node; and controlling an operation of the second network node.

13. The method of claim 11, wherein determining the first vulnerability state and the second vulnerability state correspond to the predefined pattern of vulnerability states comprises:

determining that the first vulnerability state of the first network node is a first vulnerability state type; and determining that a second vulnerability state of the second network node is a second vulnerability state type different from the first vulnerability state type.

14. The method of claim 13, further comprising:

based on comparing the first vulnerability state type to the second vulnerability state type:

generating a vulnerability remediation policy prioritizing a first remediation action to remediate the first vulnerability state above a second remediation action to remediate the second vulnerability state.

15. The method of claim 14, wherein generating the vulnerability remediation policy prioritizing the first remediation action above the second remediation action includes: (a) determining that performing the first remediation action without performing the second remediation action closes the breach path, and (b) determining that performing the second remediation action without performing the first remediation action leaves intact the breach path.

16. The method of claim 11, wherein the set of vulnerability definitions map vulnerabilities of the first network node and the second network node to network threats resulting from the vulnerabilities.

17. The method of claim 11, wherein searching the network topology description for the third network node, further comprises:

determining the third network node corresponds to a third vulnerability state; and determining the first vulnerability state, the second vulnerability state, and the third vulnerability correspond to the predefined pattern of vulnerability states associated with the breach path.

18. A system comprising:

one or more processors; and memory storing instructions that, when executed by the one or more processors, cause the system to perform operations comprising:

obtaining a network topology description, the network topology description describing a plurality of network nodes and relationships among the plurality of network nodes;

applying a set of vulnerability definitions to the network topology description to detect a set of vulnerability states associated with a first set of network nodes among the plurality of network nodes;

based on the set of vulnerability states associated with the first set of network nodes, identifying two or more network nodes having a particular relationship, the two or more network nodes comprising a first network node corresponding to a first vulnerability state and a second network node corresponding to a second vulnerability state;

determining that the first vulnerability state and the second vulnerability state correspond to a predefined pattern of vulnerability states;

responsive to (a) identifying the predefined pattern of vulnerability states and (b) determining the first network node and the second network node have a particular relationship:

identifying a potential breach path associated with the first network node and the second network node;

based on identifying the potential breach path associated with the two or more network nodes:

searching the network topology description for a third network node along a communication path between the first network node and the second network node; and based on identifying the third network node: designating a set of network nodes including the first network node, the second network node, and the third network node as the breach path.

19. The system of claim 18, wherein searching the network topology description for the third network node, further comprises:

determining the third network node corresponds to a third vulnerability state; and determining the first vulnerability state, the second vulnerability state, and the third vulnerability correspond to the predefined pattern of vulnerability states associated with the breach path.

* * * * *